(12) United States Patent
Hirano et al.

(10) Patent No.: US 9,326,015 B2
(45) Date of Patent: Apr. 26, 2016

(54) INFORMATION PROCESSING APPARATUS, INFORMATION PROCESSING SYSTEM, INFORMATION PROCESSING METHOD, AND NON-TRANSITORY COMPUTER READABLE MEDIUM

(75) Inventors: Yasuhiro Hirano, Kanagawa (JP); Kimitake Hasuike, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 10 days.

(21) Appl. No.: 13/556,797

(22) Filed: Jul. 24, 2012

(65) Prior Publication Data

US 2013/0246532 A1      Sep. 19, 2013

(30) Foreign Application Priority Data

Mar. 14, 2012   (JP) ................. 2012-057865

(51) Int. Cl.
  *G06F 15/16*   (2006.01)
  *H04N 21/254*  (2011.01)
  *H04N 21/258*  (2011.01)
  *H04N 21/475*  (2011.01)

(52) U.S. Cl.
  CPC ..... *H04N 21/2541* (2013.01); *H04N 21/25875* (2013.01); *H04N 21/4753* (2013.01)

(58) Field of Classification Search
  USPC ............. 709/205, 214; 715/273, 760; 380/28
  See application file for complete search history.

(56) References Cited

U.S. PATENT DOCUMENTS

| | | | |
|---|---|---|---|
| 7,072,984 B1 * | 7/2006 | Polonsky et al. | 709/246 |
| 7,302,674 B1 * | 11/2007 | Gladieux et al. | 717/101 |
| 2002/0073163 A1 * | 6/2002 | Churchill et al. | 709/214 |
| 2005/0165777 A1 * | 7/2005 | Hurst-Hiller et al. | 707/4 |
| 2008/0189608 A1 * | 8/2008 | Nurmi | 715/273 |
| 2009/0046848 A1 * | 2/2009 | Booth | 380/28 |
| 2010/0074524 A1 * | 3/2010 | Stollman | 382/175 |
| 2012/0159355 A1 * | 6/2012 | Fish et al. | 715/759 |
| 2012/0194448 A1 * | 8/2012 | Rothkopf | 345/173 |
| 2012/0233150 A1 * | 9/2012 | Naim et al. | 707/722 |
| 2012/0233558 A1 * | 9/2012 | Naim et al. | 715/760 |

FOREIGN PATENT DOCUMENTS

| | | |
|---|---|---|
| JP | 2002-149636 A | 5/2002 |
| JP | 2005-165777 A | 6/2005 |
| JP | 2006-259918 A | 9/2006 |
| JP | 2006-260065 A | 9/2006 |

OTHER PUBLICATIONS

Communication dated Nov. 24, 2015 from the Japanese Patent Office in counterpart application no. 2012-057865.

* cited by examiner

*Primary Examiner* — Tammy Nguyen
(74) *Attorney, Agent, or Firm* — Sughrue Mion, PLLC

(57) ABSTRACT

An information processing apparatus includes a specifying unit, a control information obtaining unit, and a processing unit. The specifying unit specifies data which is to be used by plural users in response to a request from a requesting user. The control information obtaining unit obtains control information which is information for controlling use of the data specified by the specifying unit and for associating a portion of the data, a user who is allowed to use the portion among the plural users, and a usage environment in which the user uses the portion. The processing unit performs, when a predetermined storage operation of storing the control information is performed by the requesting user, a process of storing the control information obtained by the control information obtaining unit in association with the data specified by the specifying unit.

13 Claims, 8 Drawing Sheets

FIG. 6

| PAGE | USER IN CHARGE | INITIAL DISPLAY FLAG | INITIAL VALUE OF MARKER COLOR | MESSAGE |
|---|---|---|---|---|
| 1 | | | | |
| 2 | | | | |
| 3 | B | ON | RED | PLEASE CHECK THE SENTENCES. |
| 4 | B | OFF | RED | PLEASE CHECK THE SENTENCES. |
| 5 | B | OFF | RED | PLEASE CHECK THE SENTENCES. |
| 6 | C | ON | BLUE | PLEASE CHECK THE FIGURES. |
| 7 | C | OFF | BLUE | PLEASE CHECK THE FIGURES. |
| 8 | C | OFF | BLUE | PLEASE CHECK THE FIGURES. |
| 9 | C | OFF | BLUE | PLEASE CHECK THE FIGURES. |
| 10 | C | OFF | BLUE | PLEASE CHECK THE FIGURES. |

INFORMATION PROCESSING APPARATUS, INFORMATION PROCESSING SYSTEM, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-057865 filed Mar. 14, 2012.

BACKGROUND

(i) Technical Field

The present invention relates to an information processing apparatus, an information processing system, an information processing method, and a non-transitory computer readable medium.

SUMMARY

According to an aspect of the invention, there is provided an information processing apparatus including a specifying unit, a control information obtaining unit, and a processing unit. The specifying unit specifies data which is to be used by plural users in response to a request from a requesting user. The control information obtaining unit obtains control information which is information for controlling use of the data specified by the specifying unit and for associating a portion of the data, a user who is allowed to use the portion among the plural users, and a usage environment in which the user uses the portion. The processing unit performs, when a predetermined storage operation of storing the control information is performed by the requesting user, a process of storing the control information obtained by the control information obtaining unit in association with the data specified by the specifying unit.

BRIEF DESCRIPTION OF THE DRAWINGS

An exemplary embodiment of the present invention will be described in detail based on the following figures, wherein:

FIG. 6 is a diagram illustrating an example of job requests that are stored in a job request memory according to the exemplary embodiment;

DETAILED DESCRIPTION

Hereinafter, an exemplary embodiment of the present invention will be described in detail with reference to the attached drawings.

Figure 1:
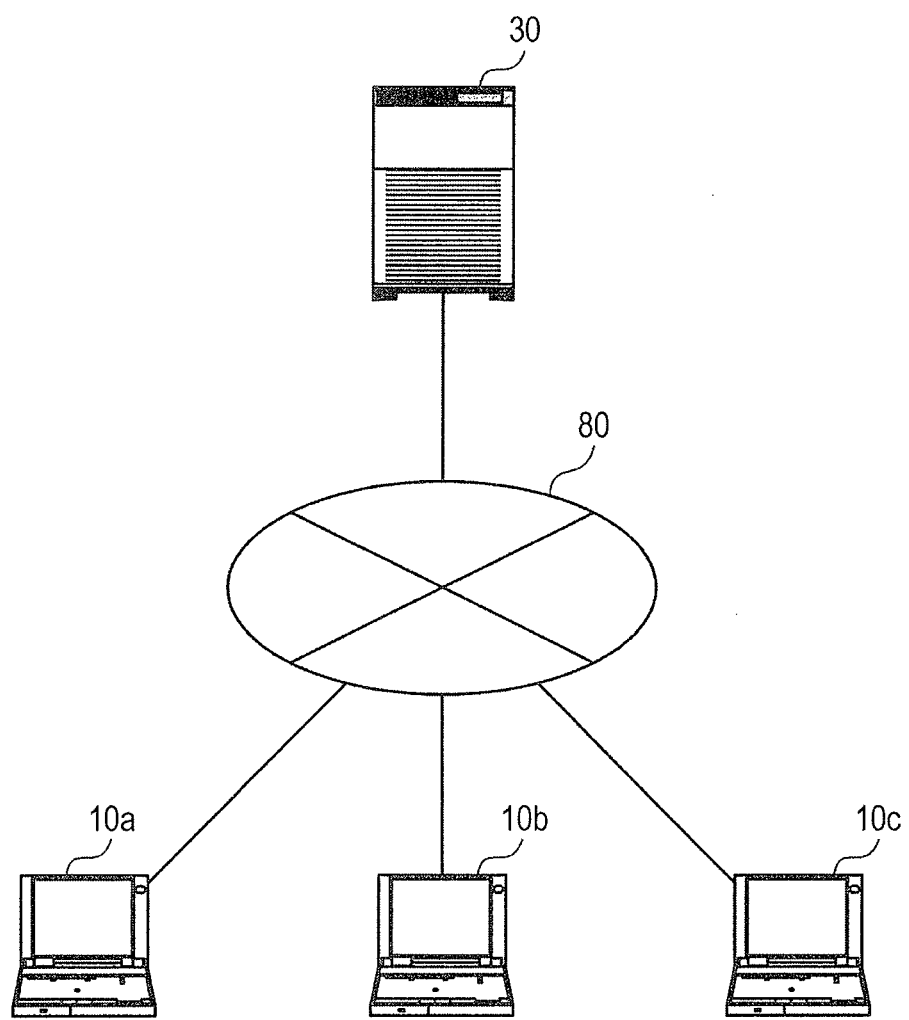
FIG. 1 is a diagram illustrating an example configuration of a computer system according to an exemplary embodiment of the present invention.

FIG. 1 illustrates an example configuration of an entire computer system according to the exemplary embodiment.

As illustrated in FIG. 1, the computer system includes client terminals 10a, 10b, and 10c and a document server 30, which are connected to one another via a network 80.

Each of the client terminals 10a, 10b, and 10c illustrated in FIG. 1 will be referred to as a client terminal 10 when it is not necessary to distinguish them from one another. Though three client terminals 10 are illustrated in FIG. 1, four or more client terminals 10 may be provided.

Each of the client terminals 10 is a computer apparatus that is used by a user to, for example, view or edit a document file. Specifically, the client terminal 10 downloads a document file from the document server 30, allows a user to view or edit the document file, and then uploads the document file to the document server 30, in response to a user operation. Here, examples of the client terminal 10 include a desktop personal computer (PC), a notebook PC, a tablet PC, a wearable computer, a personal digital assistant (PDA), a smart phone, and a mobile phone. In the exemplary embodiment, the client terminal 10 is provided as an example of a request providing apparatus and a data using apparatus.

The document server 30 is a computer apparatus that stores a document file on which a user performs viewing, editing, etc. Specifically, the document server 30 stores a file created by using word processor software, spreadsheet software, presentation software, or the like, or a file in a portable document format (PDF) in which an original image may be reproduced without depending on the viewing environment. Note that, in this specification, a "document file" is not always a file generated by digitalizing a "document" including text. For example, graphic data of figures or the like, and image data of pictures, photos, or the like may also be included in a "document file" regardless of whether the data is raster data or vector data. Here, a PC or the like may be used as the document server 30. In the exemplary embodiment, the document server 30 is provided as an example of a management apparatus.

The network 80 is a communication medium used for information communication performed between each of the client terminals 10 and the document server 30, and is the Internet, for example.

Next, a hardware configuration of the client terminal 10 will be described.

Figure 2:
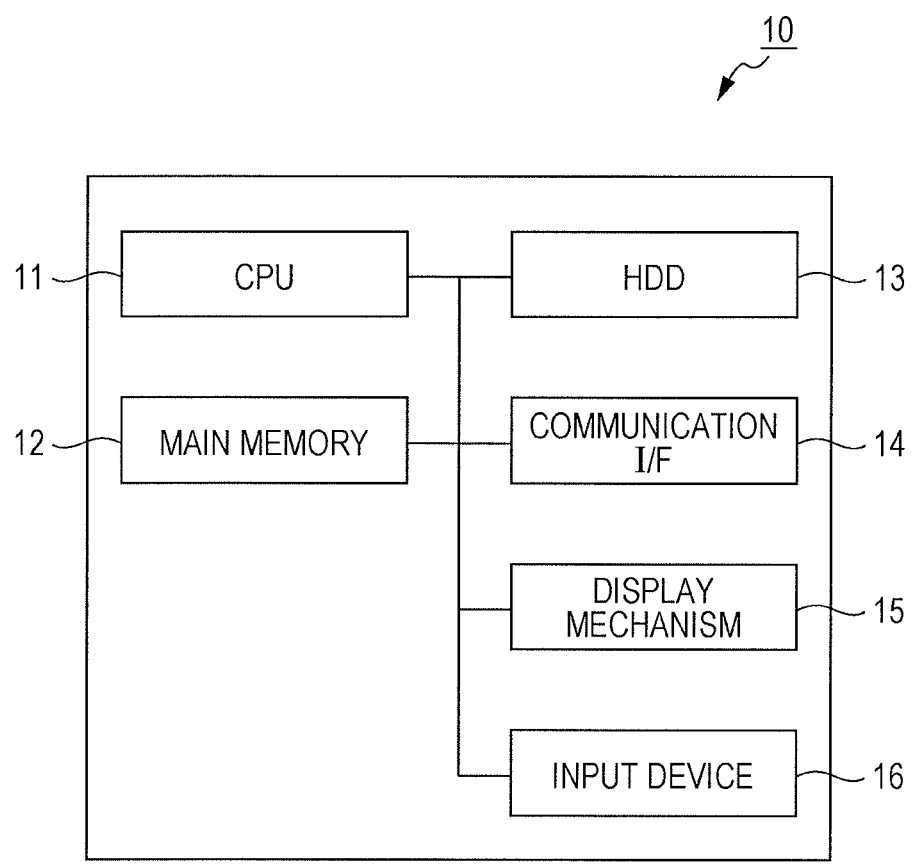
FIG. 2 is a diagram illustrating an example hardware configuration of a client terminal according to the exemplary embodiment.

FIG. 2 is a diagram illustrating an example hardware configuration of the client terminal 10.

As illustrated in FIG. 2, the client terminal 10 includes a central processing unit (CPU) 11 serving as a processor, a main memory 12 serving as a storage unit, and a hard disk drive (HDD) 13 serving as a storage unit. Here, the CPU 11 executes an operating system (OS) and various types of software such as applications, thereby realizing the various functions described below. The main memory 12 is a storage region that stores the various types of software and the data used for executing the software. The HDD 13 is a storage region that stores data input for the various types of software and data output from the various types of software. When the client terminal 10 is a smart phone or a mobile phone, a flash storage may be used instead of the HDD 13.

The client terminal 10 further includes a communication interface (hereinafter referred to as a communication I/F) 14 used for communicating with an external apparatus, a display mechanism 15 including a video memory and a display, and an input device 16 including a keyboard and a mouse.

FIG. 2 may be regarded as a diagram illustrating a hardware configuration of the document server 30. In this case, the CPU 11, the main memory 12, the HDD 13, the communication I/F 14, the display mechanism 15, and the input device 16 are replaced by a CPU 31, a main memory 32, an HDD 33, a communication I/F 34, a display mechanism 35, and an input device 36, respectively.

In the computer system illustrated in FIG. 1, viewing, editing, etc. of a document file stored in the document server 30 may be performed in parallel by plural users using the individual client terminals 10.

For example, a user (requesting user) may request plural users (users in charge) to perform a job, such as checking of the content of a single document file. In many cases, the requesting user wants to request the individual users in charge to perform different jobs, for example, jobs of checking different portions, or different types of jobs. In such a case, the requesting user may usually use a method in which document files are created for the individual users in charge, the document files including job request information, and then the created document files are provided to the users in charge, or a method in which comments including job request information for the individual users in charge are added to a single document file, and then the single document file is provided to the users in charge.

In the former method, it is troublesome for the requesting user to create document files for individual users in charge, and the burden of managing the increased number of document files is heavy. In the latter method, the users in charge may have trouble in finding the portions that they are to check.

In the exemplary embodiment, a requesting user is allowed to add job request information to a document file in units of pages or in units of users in charge. When a user in charge views the document file, the correspondence between the user in charge and job request information is checked, and the display format of the document file and the setting value of a function are controlled.

Figure 3:
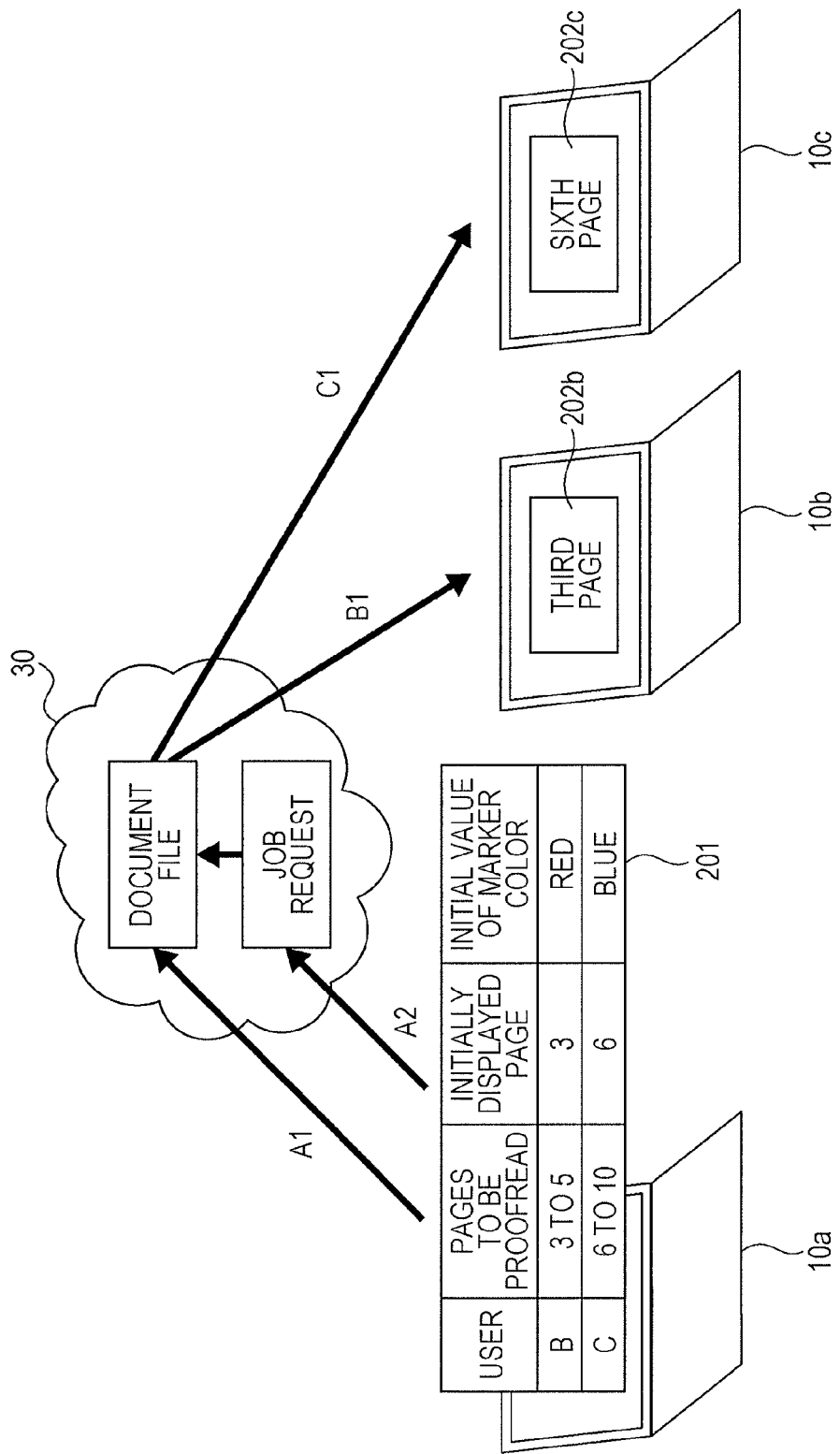
FIG. 3 is a diagram schematically illustrating an outline of the exemplary embodiment.

FIG. 3 is a diagram schematically illustrating an outline of the exemplary embodiment. Here, it is assumed that user A who is using the client terminal 10*a* requests user B who is using the client terminal 10*b* and user C who is using the client terminal 10*c* to proofread a document file created by user A.

Specifically, user A opens a property screen of an application for creating a document file by using the client terminal 10*a*, and inputs a job request setting 201. That is, user A first specifies user B and user C as proofreaders. Also, for example, user A specifies the third to fifth pages as the pages to be proofread by user B and the sixth to tenth pages as the pages to be proofread by user C, among ten pages of the document file. Furthermore, user A specifies the third page and the sixth page as initially displayed pages for viewing by user B and user C, respectively, and specifies red and blue as initial values of a marker color which is to be used by user B and user C, respectively, during proofreading.

Then, when storing the document file in the document server 30 as indicated by arrow A1, the client terminal 10*a* also stores information which is based on the job request setting 201 (hereinafter also referred to as a "job request") in the document server 30 as indicated by arrow A2.

After that, when user B requests viewing of the document file by using the client terminal 10*b*, the client terminal 10*b* retrieves, from the document server 30, the document file to be worked upon, as indicated by arrow B1. The document file to be worked upon includes a job request reflected therein. When user B opens the document file to be worked upon, an image 202*b* on the third page is first displayed. Also, display control is performed so that only the third to fifth pages are displayed, and thereby user B may easily view the pages to be proofread. Furthermore, when user B marks something in the document file to be worked upon, the color of the marker is initially red.

On the other hand, when user C requests viewing of the document file by using the client terminal 10*c*, the client terminal 10*c* retrieves, from the document server 30, the document file to be worked upon, as indicated by arrow C1. The document file to be worked upon includes a job request reflected therein. When user C opens the document file to be worked upon, an image 202*c* on the sixth page is first displayed. Also, display control is performed so that only the sixth to tenth pages are displayed, and thereby user C may easily view the pages to be proofread. Furthermore, when user C marks something in the document file to be worked upon, the color of the marker is initially blue.

Next, the configuration of the individual apparatuses according to the exemplary embodiment will be described.

Figure 4:
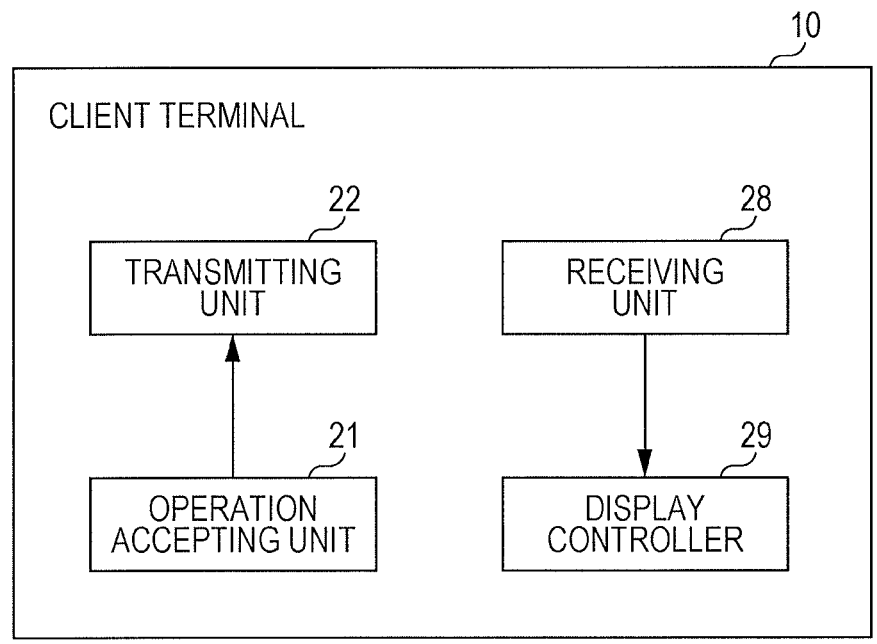
FIG. 4 is a block diagram illustrating an example functional configuration of the client terminal according to the exemplary embodiment.

FIG. 4 is a block diagram illustrating an example functional configuration of the client terminal 10.

As illustrated in FIG. 4, the client terminal 10 includes an operation accepting unit 21, a transmitting unit 22, a receiving unit 28, and a display controller 29.

The operation accepting unit 21 accepts, from a user, an operation of logging into the document server 30, an operation of selecting a document file to be viewed or edited, an operation of storing a document file which has been received from the document server 30 and which has been viewed or edited, etc.

The transmitting unit 22 transmits, to the document server 30, identification information of a user (hereinafter referred to as a "user ID") when the operation accepting unit 21 accepts an operation of logging into the document server 30 from the user, identification information of a document file (hereinafter referred to as a "document ID") when the operation accepting unit 21 accepts an operation of selecting the document file from a user, and a document file, a document ID of the document file, and a job request when the operation accepting unit 21 accepts an operation of storing the document file in the document server 30 from a user. Here, an example of a document ID may be information indicating a storage site of a document file in the document server 30. The information indicating a storage site may be, for example, a uniform resource identifier (URI). In the exemplary embodiment, a document file is used as an example of data. A document ID is used as an example of first identification information for identifying data. A user ID is used as an example of second identification information for identifying a user. A job request is used as an example of control information for controlling use of data. The transmitting unit 22 is provided as an example of a first transmitting unit that transmits data, first identification information, and control information when a storage operation is performed by a user, and a second transmitting unit that transmits first identification information and second identification information when an obtaining operation is performed by a user.

The receiving unit 28 receives, from the document server 30, a list of document IDs of document files that may be viewed or edited by a user when the transmitting unit 22 transmits the user ID of the user, and a document file to be worked upon which is stored in the site indicated by a document ID and in which a job request is reflected when the transmitting unit 22 transmits the document ID.

The display controller 29 performs control so that a list of document IDs, a document file to be worked upon, and so forth received by the receiving unit 28 are displayed on the display mechanism 15.

These functional units are achieved when software and hardware resources operate in cooperation with each other. Specifically, these functional units are achieved when the CPU 11 reads a program for achieving the operation accepting unit 21, the transmitting unit 22, the receiving unit 28, and the display controller 29 from the HDD 13 to the main memory 12, and then executes the program.

Figure 5:
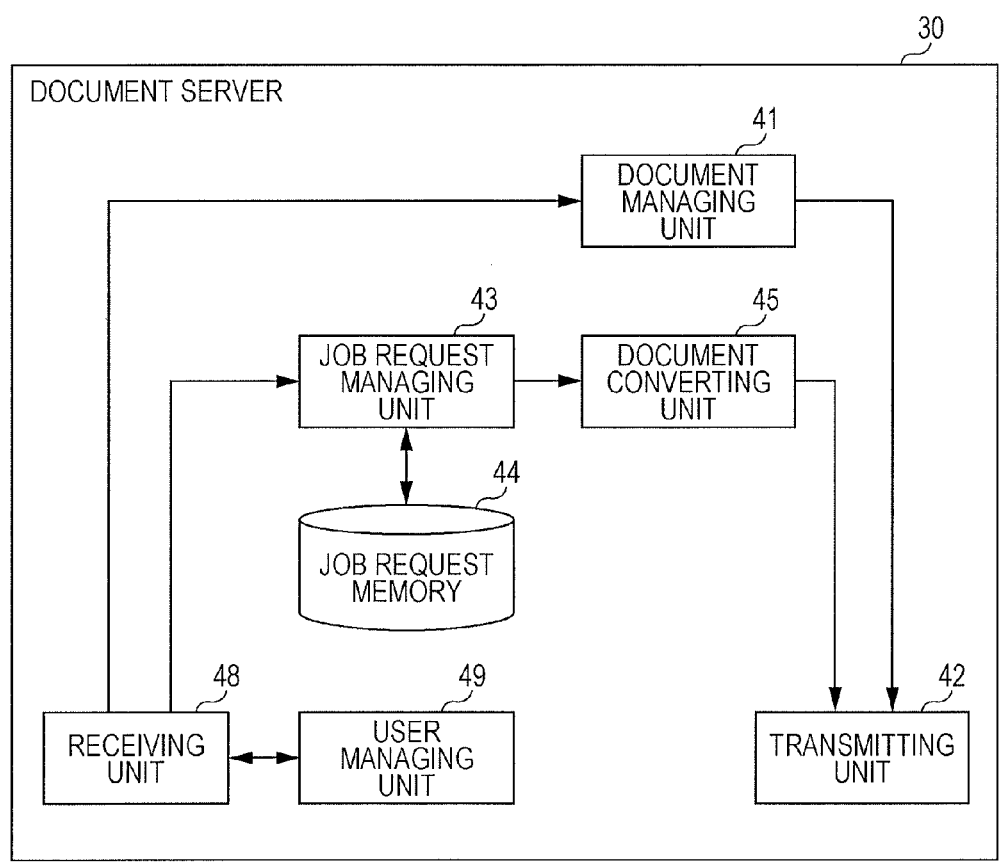
FIG. 5 is a block diagram illustrating an example functional configuration of a document server according to the exemplary embodiment.

FIG. 5 is a block diagram illustrating an example functional configuration of the document server 30.

As illustrated in FIG. 5, the document server 30 includes a document managing unit 41, a transmitting unit 42, a job request managing unit 43, a job request memory 44, a document converting unit 45, a receiving unit 48, and a user managing unit 49.

The document managing unit 41 manages a document file in a storage site, which is indicated by a document ID, of a document memory (not illustrated). That is, the document managing unit 41 obtains a document file from the document memory or stores a document file in the document memory. Also, the document managing unit 41 manages a document file by associating the document file with a user who is allowed to perform viewing, editing, etc. on the document file. For example, the document managing unit 41 associates user IDs with document IDs, and thereby obtains a document ID of a document file on which a certain user is allowed to perform viewing, editing, etc. In the exemplary embodiment, the document managing unit 41 is provided as an example of a memory that stores data when the data, first identification information, and control information are transmitted by the first transmitting unit.

The transmitting unit 42 transmits, to the client terminal 10, a list of document IDs when the document managing unit 41 obtains the list of document IDs of document files on which a user is allowed to perform viewing, editing, etc., and a document file to be worked upon, which is a converted document file, when the document converting unit 45 converts the document file in response to a job request. In the exemplary embodiment, the transmitting unit 42 is provided as an example of a processing unit that performs a process of displaying a specific portion of data when an obtaining operation is performed by a user, and a third transmitting unit that transmits data when first identification information and second identification information are transmitted by the second transmitting unit.

The job request managing unit 43 manages, in the job request memory 44, a job request that has been set to a document file by a user, in association with the document ID of the document file. That is, the job request managing unit 43 obtains a job request from the job request memory 44 by using a document ID as a key, and stores a job request in the job request memory 44 in association with a document ID. In the exemplary embodiment, the job request managing unit 43 is provided as an example of a processing unit that performs a process of storing control information when a storage operation is performed by a requesting user.

The job request memory 44 stores a job request in association with a document ID, under the management performed by the job request managing unit 43. In the exemplary embodiment, the job request memory 44 is provided as an example of a memory that stores control information when data, first identification information, and control information are transmitted by the first transmitting unit. The job request stored in the job request memory 44 will be described below.

The document converting unit 45 converts a document file obtained by the document managing unit 41 in accordance with a job request obtained by the job request managing unit 43, thereby generating a document file to be worked upon.

The receiving unit 48 receives, from the client terminal 10, a user ID when a user performs an operation of logging into the document server 30, a document ID of a document file when a user performs an operation of selecting the document file, and a document file, a document ID of the document file, and a job request when a user performs an operation of storing the document file in the document server 30. In the exemplary embodiment, the receiving unit 48 is provided as an example of a specifying unit that specifies data, a control information obtaining unit that obtains control information, and a data obtaining unit that obtains data.

The user managing unit 49 manages a user ID received by the receiving unit 48. That is, when a user logs into the document server 30, the receiving unit 48 receives a password in addition to a user ID. The user managing unit 49 performs user authentication by determining whether or not a set of the user ID and the password exists among sets of a user ID and a password that are registered in advance. If the user authentication is successfully performed, the user managing unit 49 generates a session ID, and associates the session ID with the user ID. After that, when the receiving unit 48 receives information, which includes the session ID, in a state where the login status of the user continues, the user managing unit 49 transmits the user ID associated with the session ID to the receiving unit 48.

These functional units are achieved when software and hardware resources operate in cooperation with each other. Specifically, these functional units are achieved when the CPU 31 reads a program for achieving the document managing unit 41, the transmitting unit 42, the job request managing unit 43, the document converting unit 45, the receiving unit 48, and the user managing unit 49 from the HDD 33 to the memory 32, and executes the program. The job request memory 44 is achieved by, for example, the HDD 33.

FIG. 6 is a diagram illustrating an example of job requests stored in the job request memory 44. Here, job requests for a single document file are illustrated. The job request memory 44 actually stores job requests for plural document files. Each job request is associated with a document ID, so as to be identifiable as a job request for which document file.

As illustrated in FIG. 6, each job request includes the items "page", "user in charge", "initial display flag", "initial value of marker color", and "message". The job requests illustrated in FIG. 6 correspond to the job request setting 201 illustrated in FIG. 3 with messages to individual users in charge being added.

"Page" is a unit defined by dividing a document file into segments, each having a predetermined number of lines, regardless of semantic content. In this specification, it is assumed that setting is performed in units of pages. Alternatively, for example, setting may be performed in units of segments that are set in view of semantic content, such as a chapter or section of a document file. In this sense, "page" is an example of a portion of data.

"User in charge" is a user who views the corresponding page and performs a job, such as checking of content. Here, the stored job requests show that user B is a user in charge of the third page to the fifth page, and user C is a user in charge of the sixth page to the tenth page.

"Initial display flag" is a flag representing whether or not the corresponding page is initially displayed when the person in charge opens a document file to be worked upon. "ON" represents that the corresponding page is initially displayed, and "OFF" represents that the corresponding page is not initially displayed. Here, the stored job requests show that the third page is initially displayed when user B opens the document file to be worked upon, and the sixth page is initially displayed when user C opens the document file to be worked upon. An initially displayed page is an example of a part that is initially displayed when a user views a portion of a document file. In this case, a group of pages assigned to a user is an example of a portion of data.

"Initial value of marker color" represents the color that is initially set for the marker which is used for the corresponding page by the user in charge. Here, the stored job requests show that the marker color used for the document file to be worked upon by user B is initially red, and the marker color used for the document file to be worked upon by user C is initially blue.

"Message" is a message displayed when a user in charge opens the corresponding page. Here, the stored job requests show that a message "please check the sentences" is displayed when user B opens the corresponding page, and a message "please check the figures" is displayed when user C opens the corresponding page.

In FIG. 6, initial display flags, initial values of marker color, and messages are illustrated as information for controlling the display format of the corresponding page and the setting value of a function. Alternatively, other information may be used instead of these items.

For example, another setting value used by a user in charge to update a page may be stored instead of an initial value of a marker color. An example of such a setting value may be a format of text (for example, font, bold, italic, underline, or color) that is to be used when a user in charge writes a comment onto a page. Here, the initial value of a marker color and the format of text are examples of the format of information that is to be used by a user to update a portion of a document file. Alternatively, phrases or the like that are to be used when a user in charge writes a comment onto a page may be stored. Here, such phrases are an example of content of information that is to be used by a user to update a portion of a document file.

Alternatively, another setting value that is displayed when a user in charge views a page may be stored instead of a message. Here, a message is an example of content of information that is displayed when a user views a portion of a document file. Alternatively, a format of text in a page when a user in charge opens a page may be stored. Here, such a format of text is an example of a format of information that is displayed when a user views a portion of a document file.

Furthermore, information regarding an environment in which a document file is used, other than the initial display flag, the initial value of a marker color, and the message, may be stored. Here, the initial display flag, the initial value of a marker color, and the message are examples of a usage environment in which a user uses a portion of a document file.

In the example illustrated in FIG. 6, the same initial value of a marker color and the same message are set for the pages assigned to the same user in charge, but such a setting is not necessarily performed. That is, different initial values of a marker color and different messages may be set for the individual pages assigned to the same user in charge.

Next, operation according to the exemplary embodiment will be described.

Figure 7:
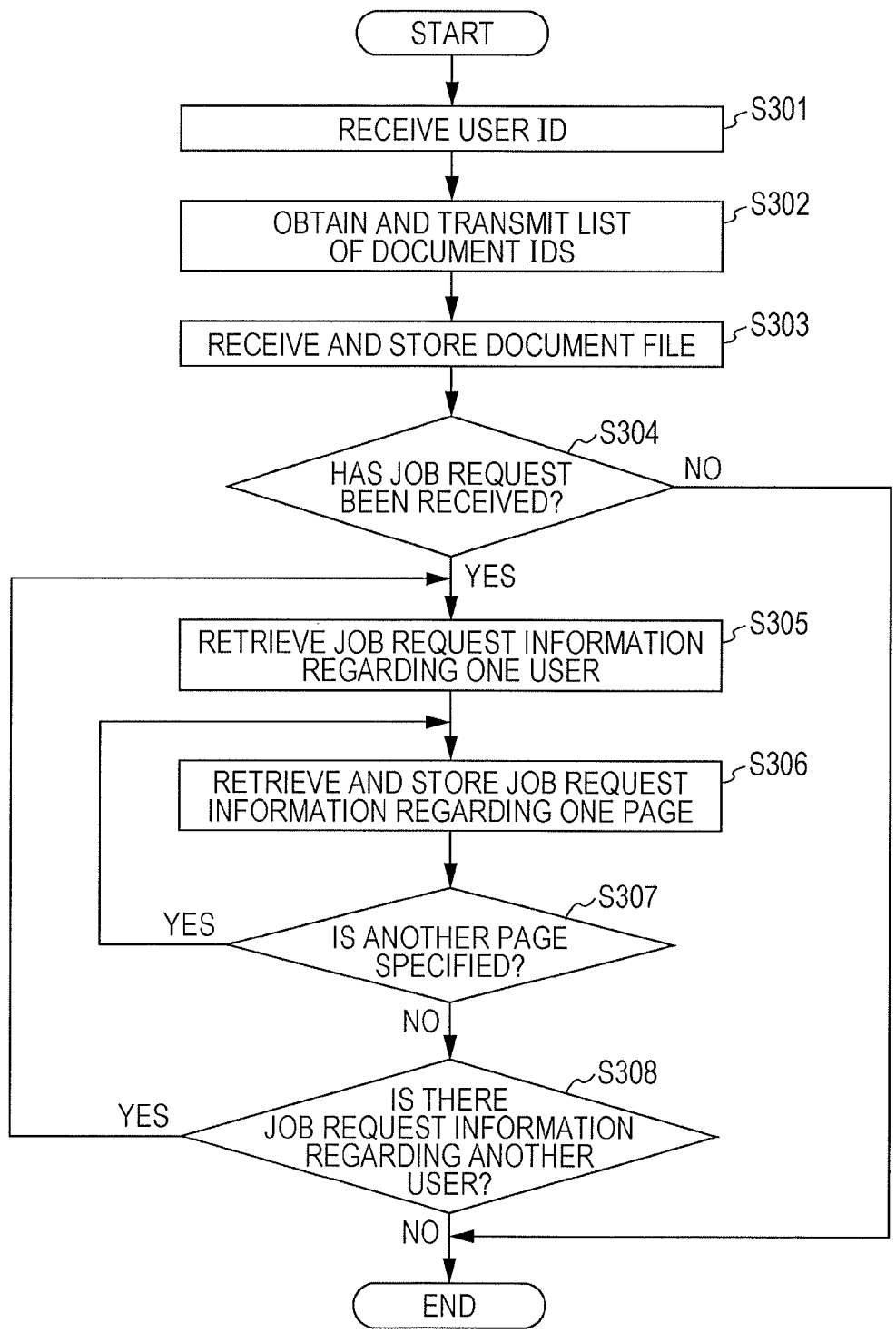
FIG. 7 is a flowchart illustrating an example of operation of registering a job request performed in the document server according to the exemplary embodiment.

FIG. 7 is a flowchart illustrating an example of operation of registering a job request performed in the document server 30. The operation illustrated in this flowchart starts when the operation accepting unit 21 of the client terminal 10 accepts an operation of logging into the document server 30 and then the transmitting unit 22 of the client terminal 10 transmits a user ID to the document server 30.

Upon the operation being started, the receiving unit 48 of the document server 30 receives a user ID in step S301. The user ID is managed by the user managing unit 49, and a subsequent access from the same user is recognizable as long as a login status continues.

The receiving unit 48 transmits the user ID to the document managing unit 41. Accordingly, the document managing unit 41 obtains a list of document IDs of document files associated with the user ID, and the transmitting unit 42 transmits the list of document IDs to the client terminal 10 in step S302. Accordingly, in the client terminal 10, the receiving unit 28 receives the list of document IDs, and the display controller 29 performs control so that the list of document IDs is displayed.

At this time, in the case of retrieving a document file from the document server 30, the user selects the document ID of the document file from the list of document IDs. Here, it is assumed that a document file created in the client terminal 10 is to be stored in the document server 30, and that the user performs an operation of storing the document file in the document server 30. In the client terminal 10, the operation accepting unit 21 accepts this operation, and the transmitting unit 22 transmits the document ID and the document file to the document server 30. If the user has set a job request to the document file, the transmitting unit 22 also transmits the job request to the document server 30. Accordingly, in the document server 30, the receiving unit 48 receives the document ID and the document file and transmits them to the document managing unit 41, and the document managing unit 41 stores the document file in the site indicated by the document ID in step S303.

Also, the receiving unit 48 determines in step S304 whether or not a job request has been received together with the document ID and the document file.

If the receiving unit 48 determines that the job request has been received, the receiving unit 48 transmits the document ID and the job request to the job request managing unit 43, and the job request managing unit 43 stores the job request in the job request memory 44 in association with the document ID. Note that, it is natural for a requesting user to input a job request as a request to each user in charge, but it is convenient for each user in charge that a request is set to each page in the display control when a document file to be worked upon is opened. Thus, format conversion is performed here.

That is, the job request managing unit 43 retrieves job request information regarding one user in step S305. For example, the job request managing unit 43 retrieves a record corresponding to user B in the job request setting 201 illustrated in FIG. 3.

Subsequently, since plural pages may be specified in the job request information regarding one user in some cases, the job request managing unit 43 retrieves job request information regarding one page and stores it in the job request memory 44 in step S306. For example, it is assumed that the job request information regarding the third page is retrieved from the record corresponding to user B in the job request setting 201 illustrated in FIG. 3. In this case, the record corresponding to the third page of the job request illustrated in FIG. 6 is stored.

In step S307, the job request managing unit 43 determines whether or not another page is specified in the job request information retrieved in step S305.

If it is determined that another page is specified, the process returns to step S306. If it is determined that another page is not specified, the job request managing unit 43 determines in step S308 whether or not there is job request information regarding another user. If it is determined that there is job request information regarding another user, the process returns to step S305. If it is determined that there is no job request information regarding another user, the process ends.

If it is determined in step S304 that a job request has not been received, the process ends.

Figure 8:
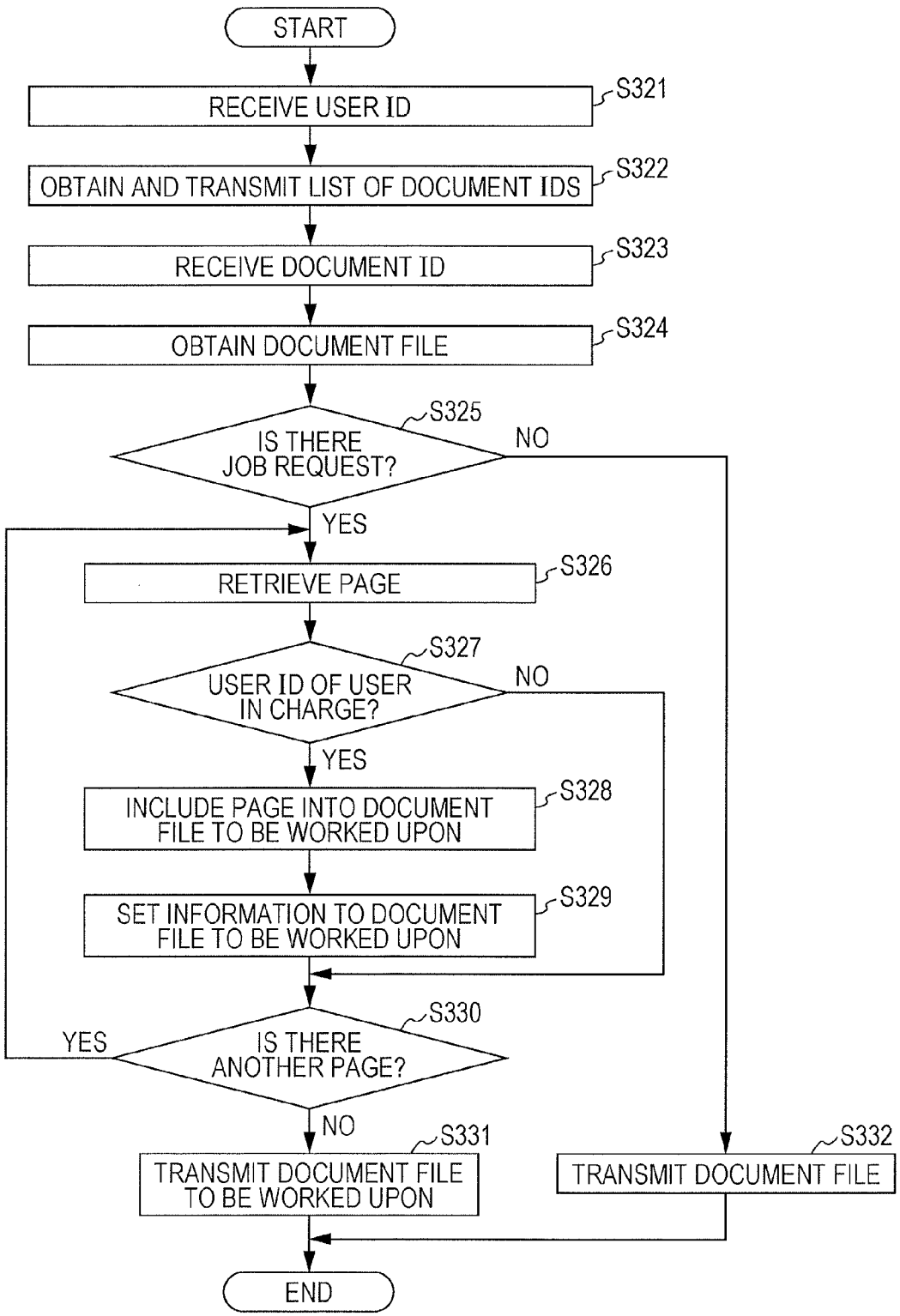
FIG. 8 is a flowchart illustrating an example of operation of generating a document file to be worked upon performed in the document server according to the exemplary embodiment.

FIG. 8 is a flowchart illustrating an example of operation of creating a document file to be worked upon performed in the document server 30. The operation illustrated in this flowchart starts when the operation accepting unit 21 of the client terminal 10 accepts an operation of logging into the document server 30 and then the transmitting unit 22 of the client terminal 10 transmits a user ID to the document server 30.

Upon the operation being started, the receiving unit 48 of the document server 30 receives a user ID in step S321. The user ID is managed by the user managing unit 49, and a subsequent access from the same user is recognizable as long as a login status continues.

The receiving unit 48 transmits the user ID to the document managing unit 41. Accordingly, the document managing unit 41 obtains a list of document IDs of document files associated with the user ID, and the transmitting unit 42 transmits the list of document IDs to the client terminal 10 in step S322. Accordingly, in the client terminal 10, the receiving unit 28 receives the list of document IDs, and the display controller 29 performs control so that the list of document IDs is displayed.

Subsequently, in the client terminal 10, the operation accepting unit 21 accepts an operation of selecting, from the list of document IDs, the document ID of a document file on which viewing, editing, or the like is to be performed, and the transmitting unit 22 transmits the selected document ID to the document server 30. Accordingly, the receiving unit 48 of the document server 30 receives the document ID in step S323.

Subsequently, the receiving unit 48 transmits the document ID to the document managing unit 41, and the document managing unit 41 obtains the document file which is stored in the site indicated by the document ID in step S324. The document file obtained here is transmitted to the document converting unit 45.

Also, the receiving unit 48 transmits the document ID to the job request managing unit 43. Accordingly, the job request managing unit 43 determines in step S325 whether or not a job request associated with the document ID is stored in the job request memory 44.

If it is determined that a job request associated with the document ID is stored in the job request memory 44, the job request managing unit 43 transmits the job request to the document converting unit 45, and the document converting unit 45 starts a document conversion process in which the document file obtained in step S324 is converted in accordance with the job request. It is assumed that the receiving unit 48 has transmitted the user IDs managed by the user managing unit 49 to the document converting unit 45 before the document conversion process is performed. Also, it is assumed that the document converting unit 45 prepares, in a memory for storing a document file to be worked upon, the structure of the document file to be worked upon not including pages.

In the document conversion process, the document converting unit 45 retrieves a page of the document file in step S326. Also, the document converting unit 45 determines in step S327 whether or not the user ID received from the receiving unit 48 matches the user ID of the user in charge who is set for this page in the job request.

If it is determined that the received user ID matches the user ID of the user in charge who is set in the job request, the document converting unit 45 includes this page into the document file to be worked upon in step S328. For example, when it is assumed that the user ID of user B is received in step S321 and that the third page of the document file to which the job request in FIG. 6 is set is retrieved in step S326, the third page is included in the document file to be worked upon. Also, the document converting unit 45 sets, to the document file to be worked upon, the information set to this page in the job request in step S329. For example, it is assumed that the third page of the document file to which the job request in FIG. 6 is set is retrieved in step S326. In this case, setting is performed so that the third page is initially displayed when the document file to be worked upon is opened, the initial value of a marker color used in this page is red, and a message "please check the sentences" is displayed in, for example, a speech balloon when this page is opened. Subsequently, the process proceeds to step S330.

If it is determined in step S327 that the received user ID does not match the user ID of the user in charge in the job request, the process proceeds to step S330 without including this page into the document file to be worked upon and without setting information to this page.

Subsequently, the document converting unit 45 determines in step S330 whether or not there is another page in the document file.

If it is determined that there is another page, the process returns to step S326. If it is determined that there is not another page, the document converting unit 45 transmits the document file to be worked upon stored in the memory to the transmitting unit 42, and the transmitting unit 42 transmits the document file to be worked upon to the client terminal 10 in step S331. Accordingly, in the client terminal 10, the receiving unit 28 receives the document file to be worked upon, and the display controller 29 performs control so that the document file to be worked upon is displayed in accordance with the set information.

On the other hand, if it is determined in step S325 that the job request associated with the document ID is not stored in the job request memory 44, the document converting unit 45 transmits the document file obtained in step S324 to the transmitting unit 42 without performing conversion thereon, and the transmitting unit 42 transmits the document file to the client terminal 10 in step S332. Accordingly, in the client terminal 10, the receiving unit 28 receives the document file, and the display controller 29 performs control so that the document file is displayed. At this time, no specific display control based on a job request is performed.

In the above-described example of operation, a process is performed so that only one or more pages assigned to a user are displayed through filtering when the user opens a document file to be worked upon. This process is an example of a process of not displaying a portion other than a specific portion of data. Alternatively, the pages assigned to a user and the pages not assigned to the user may be displayed when the user opens a document file to be worked upon, and a process of enabling identification of these pages may be performed. An example of such a process may be a process of marking only the pages assigned to the user by changing a background color or attaching a sticky note thereto. Alternatively, a process of enabling the pages assigned to a user to be distinguishable from the pages not assigned to the user may be performed by performing a certain process, such as a process of highlighting the assigned pages when a display mode is switched to a thumbnail display mode and a "display assigned pages" button is pressed, though the assigned pages are not distinguishable from the unassigned pages simply by displaying the document file to be worked upon. Here, the process of enabling assigned pages to be distinguishable from unassigned pages is an example of a process of displaying a portion other than a specific portion of data in a manner different from a manner of displaying the specific portion.

This is the end of the description of the exemplary embodiment.

In the above-described exemplary embodiment, the client terminal 10 stores a job request in the document server 30 when storing a document file in the document server 30. Alternatively, the client terminal 10 may store a job request in the document server 30 in response to an explicit instruction, not when storing a document file in the document server 30. For example, the client terminal 10 may store a job request in the document server 30 together with a document file upon pressing of a button for storing the document file. Alternatively, a special button for storing a job request may be provided, and the client terminal 10 may store a job request in the document server 30 upon pressing of the special button. Alternatively, the client terminal 10 may store a job request in the document server 30 upon a predetermined storage operation being performed by a user as an operation of storing the job request.

In the above-described exemplary embodiment, the client terminal 10 retrieves a job request from the document server 30 when retrieving a document file from the document server 30. Alternatively, the client terminal 10 may retrieve a job request from the document server 30 in response to an explicit instruction, not when retrieving a document file from the document server 30. For example, the client terminal 10 may retrieve a job request from the document server 30 together with a document file upon pressing of a button for retrieving the document file. Alternatively, a special button for retrieving a job request may be provided, and the client terminal 10 may retrieve a job request from the document server 30 upon pressing of the special button. Alternatively, the client terminal 10 may retrieve a job request from the document server 30 upon a predetermined obtaining operation being performed by a user as an operation of obtaining the job request.

In the above-described exemplary embodiment, the document server 30 stores a job request as a file separated from a document file, and stores information for associating the job request with a document ID, thereby associating the document file with the job request. Alternatively, for example, the document server 30 may associate a document file with a job request by adding the job request as attribute information to the document file.

In the above-described exemplary embodiment, the client terminal 10 transmits a document file and a job request to the document server 30, and the document server 30 stores the document file and the job request in association with each other. Alternatively, for example, the client terminal 10 may transmit information for associating a document file with a job request to the document server 30, and the document server 30 may store the information. Alternatively, the client terminal 10 may store information for associating a document file with a job request. In this case, the client terminal 10 includes a document file specifying unit (not illustrated) as an example of a specifying unit that specifies a document file, a job request obtaining unit (not illustrated) as an example of a control information obtaining unit that obtains a job request, a job request storage unit (not illustrated) as an example of a processing unit that stores a job request in association with a document file upon a storage operation being performed by a user, and the display controller 29 as an example of a processing unit that displays a specific page of a document file in a specific usage environment upon an obtaining operation being performed by a user.

A program for realizing the exemplary embodiment may be provided by being stored in a recording medium, such as a compact disc-read only memory (CD-ROM), as well as be provided through a communication medium. In this case, the program causing the process illustrated in FIG. 7 to be executed and the program causing the process illustrated in FIG. 8 to be executed may be provided by being stored in the same recording medium, or may be provided by being stored in individual recording media.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a specifying unit configured to specify data which is to be used by a plurality of users in response to a request from a requesting user;
a control information obtaining unit configured to obtain, from the requesting user, control information which is information controlling use of the data specified by the specifying unit and associating a portion of the data, a user who is allowed to use the portion among the plurality of users, and a usage environment in which the user uses the portion; and
a processing unit configured to perform, when a predetermined storage operation of storing the control information is performed by the requesting user, a process of storing the control information obtained by the control information obtaining unit in association with the data specified by the specifying unit,
wherein the data specified by the specifying unit comprises a document to be reviewed and edited by the plurality of users,
wherein, based on the control information received from the requesting user, each of the plurality of users is provided with at least a portion of the document to be reviewed and edited by the user, and
wherein the portion of the document to be reviewed and edited by the user is a page range, in the document, that is to be reviewed and edited by the user.

2. The information processing apparatus according to claim 1,
wherein the specifying unit is configured to specify data which is to be used by the plurality of users in response to a request which has been provided from the requesting user, and
wherein the processing unit is configured to perform, in response to performing, by a specific user among the plurality of users, a predetermined obtaining operation in which the control information is obtained, a process of displaying a specific portion of the data associated with the specific user in the control information which is stored in association with the data specified by the specifying unit, the specific portion being displayed in a specific usage environment associated with the specific portion in the control information.

3. The information processing apparatus according to claim 2,
wherein the processing unit is configured to perform, when the obtaining operation is performed by the specific user, a process of not displaying a portion other than the specific portion of the data.

4. The information processing apparatus according to claim 2,
wherein the processing unit is configured to perform, when the obtaining operation is performed by the specific user, a process of displaying a portion other than the specific portion of the data in a manner different from a manner of displaying the specific portion.

5. The information processing apparatus according to claim 2,
wherein the usage environment includes a part which is displayed first when the user views the portion, and
wherein the specific usage environment is an environment in which a specific part associated with the specific portion in the control information is first displayed when the specific user views the specific portion.

6. The information processing apparatus according to claim 2,
wherein the usage environment includes content or a format of information which is displayed when the user views the portion, and
wherein the specific usage environment is an environment in which information having specific content or format associated with the specific portion in the control information is displayed when the specific user views the specific portion.

7. The information processing apparatus according to claim 2,
wherein the usage environment includes content or a format of information which is used when the user updates the portion, and
wherein the specific usage environment is an environment in which information having specific content or format associated with the specific portion in the control information is used when the specific user updates the specific portion.

8. The information processing apparatus according to claim 1,
wherein the processing unit is configured to perform, when the storage operation is performed by the requesting user, a process of storing, in association with the data specified by the specifying unit but separately from the data, the control information obtained by the control information obtaining unit.

9. The information processing apparatus according to claim 1, further comprising:
a data obtaining unit configured to obtain the data which is to be used by the plurality of users in response to the request from the requesting user,
wherein the processing unit is configured to perform a process of storing the data obtained by the data obtaining unit such that the control information obtained by the control information obtaining unit is added to the data.

10. An information processing system comprising:
a request providing apparatus that is used by a requesting user to request a plurality of users to use data;
a data using apparatus that is used by a specific user among the plurality of users to use the data; and
a management apparatus that manages the data,
the request providing apparatus including
a first transmitting unit configured to transmit, when a predetermined storage operation of storing the data is performed by the requesting user, the data, first identification information identifying the data, and control information, received from the requesting user, which is information controlling use of the data and associating a portion of the data, second identification information identifying a user who is allowed to use the portion among the plurality of users, and a usage environment in which the user uses the portion,
the data using apparatus including
a second transmitting unit configured to transmit, in response to performing, by the specific user, a predetermined obtaining operation in which the data is obtained, the first identification information identifying the data and the second identification information identifying the specific user, and
the management apparatus including
a memory configured to store the data and the control information in association with the first identification information in response to the data, the first identification information, and the control information being transmitted by the first transmitting unit, and
a third transmitting unit configured to transmit, in response to the first identification information and the second identification information being transmitted by the second transmitting unit, the data stored in the memory in association with the first identification information to the data using apparatus, so that a specific portion of the data associated with the second identification information in the control information, which is stored in the memory in association with the first identification information, is displayed in a specific usage environment associated with the specific portion in the control information,
wherein the data comprises a document to be reviewed and edited by the plurality of users,
wherein, based on the control information received from the requesting user, each of the plurality of users is provided with at least a portion of the document to be reviewed and edited by the user, and
wherein the portion of the document to be reviewed and edited by the user is a page range, in the document, that is to be reviewed and edited by the user.

11. An information processing method comprising:
specifying data which is to be used by a plurality of users in response to a request from a requesting user;
obtaining, from the requesting user, control information which is information for controlling use of the specified data and for associating a portion of the data, a user who is allowed to use the portion among the plurality of users, and a usage environment in which the user uses the portion; and
performing, when a predetermined storage operation of storing the control information is performed by the requesting user, a process of storing the obtained control information in association with the specified data,
wherein the specified data comprises a document to be reviewed and edited by the plurality of users, wherein, based on the control information received from the requesting user, each of the plurality of users is provided with at least a portion of the document to be reviewed and edited by the user, and wherein the portion of the document to be reviewed and edited by the user is a page range, in the document, that is to be reviewed and edited by the user.

12. A non-transitory computer readable medium storing a program causing a computer to execute a process, the process comprising:

specifying data which is to be used by a plurality of users in response to a request from a requesting user;

obtaining, from the requesting user, control information which is information for controlling use of the specified data and for associating a portion of the data, a user who is allowed to use the portion among the plurality of users, and a usage environment in which the user uses the portion; and performing, when a predetermined storage operation of storing the control information is performed by the requesting user, a process of storing the obtained control information in association with the specified data, wherein the specified data comprises a document to be reviewed and edited by the plurality of users, wherein, based on the control information received from the requesting user, each of the plurality of users is provided with at least a portion of the document to be reviewed and edited by the user, and wherein the portion of the document to be reviewed and edited by the user is a page range, in the document, that is to be reviewed and edited by the user.

13. A non-transitory computer readable medium storing a program causing a computer to execute a process, the process comprising:

specifying data which is to be used by a plurality of users in response to a request which has been provided from a requesting user; and displaying, when a predetermined obtaining operation of obtaining the data is performed by a specific user among the plurality of users, a specific portion of the data associated with the specific user according to an instruction received from the requesting user, the specific portion being displayed in a specific usage environment associated with the specific portion according to the instruction received from the requesting user, wherein the specified data comprises a document to be reviewed and edited by the plurality of users, wherein, based on the control information received from the requesting user, each of the plurality of users is provided with at least a portion of the document to be reviewed and edited by the user, and wherein the portion of the document to be reviewed and edited by the s is a page range, in the document, that is to be reviewed and edited by the user.

* * * * *